US011930336B2

(12) United States Patent
Tracy

(10) Patent No.: US 11,930,336 B2

(45) Date of Patent: Mar. 12, 2024

(54) AUDIO SYSTEM

(71) Applicant: Dennis A. Tracy, Culver City, CA (US)

(72) Inventor: Dennis A. Tracy, Culver City, CA (US)

(*) Notice: Subject to any disclaimer, the term of this patent is extended or adjusted under 35 U.S.C. 154(b) by 0 days.

(21) Appl. No.: 18/051,759

(22) Filed: Nov. 1, 2022

(65) Prior Publication Data

US 2023/0262393 A1 Aug. 17, 2023

Related U.S. Application Data

(63) Continuation of application No. 16/828,376, filed on Mar. 24, 2020, now Pat. No. 11,523,216.

(60) Provisional application No. 62/823,225, filed on Mar. 25, 2019.

(51) Int. Cl.

*H04R 3/12* (2006.01)
*H04R 1/02* (2006.01)
*H04R 1/40* (2006.01)

(52) U.S. Cl.

CPC ............... *H04R 3/12* (2013.01); *H04R 1/025* (2013.01); *H04R 1/403* (2013.01); *H04R 2201/028* (2013.01); *H04R 2420/07* (2013.01); *H04R 2420/09* (2013.01)

(58) Field of Classification Search

CPC . H04R 3/12; H04R 3/14; H04R 1/025; H04R 1/26; H04R 1/1016; H04R 1/026; H04R 1/028; H04R 1/02; H04R 1/2819; H04R 1/2803; H04R 1/403; H04R 1/40; H04R 5/02; H04R 5/023; H04R 27/00; H04R 2201/028; H04R 2420/07; H04R 2420/09; G06F 3/0202; G06F 3/165; A45C 11/00

USPC .. 381/77, 86, 87, 89, 24, 90, 152, 188, 205, 381/332, 333, 336, 111, 116, 117, 118, 381/120, 337, 339, 345, 349, 350, 351, 381/374, 385, 386, 388, 389; 181/145, 181/144, 156, 199

See application file for complete search history.

(56) References Cited

U.S. PATENT DOCUMENTS

| | | | | | |
|---|---|---|---|---|---|
| 2003/0035556 | A1 | 2/2003 | Curtis | | |
| 2008/0175395 | A1* | 7/2008 | Rice | H04R 5/04 | 381/2 |
| 2011/0019862 | A1* | 1/2011 | Smith | H04R 1/2842 | 381/386 |
| 2011/0057614 | A1 | 3/2011 | Low | | |
| 2012/0183158 | A1* | 7/2012 | Tracy | H04R 1/26 | 381/120 |
| 2017/0099546 | A1* | 4/2017 | Spitznagle | H04R 3/14 | |
| 2018/0115733 | A1 | 4/2018 | Fischer et al. | | |

FOREIGN PATENT DOCUMENTS

| | | | |
|---|---|---|---|
| WO | 2016148935 | A1 | 9/2016 |

* cited by examiner

*Primary Examiner* — Leshui Zhang

(74) *Attorney, Agent, or Firm* — Welsh Flaxman & Gitler LLC

(57) ABSTRACT

An audio system includes an audio/video receiver, a power supply/wireless audio distribution assembly connected to the audio/video receiver, speaker wire, and speakers compatible with the power supply/wireless audio distribution assembly.

15 Claims, 3 Drawing Sheets

AUDIO SYSTEM

CROSS REFERENCE TO RELATED APPLICATION

This application is a continuation of U.S. patent application Ser. No. 16/828,376, entitled "AUDIO SYSTEM," filed Mar. 24, 2020, which claims the benefit of U.S. Provisional Patent Application No. 62/823,225, entitled "AUDIO SYSTEM," filed Mar. 25, 2019, which are incorporated herein by reference.

BACKGROUND OF THE INVENTION

1. Field of the Invention

The present invention generally relates to an audio system upgrading a previously existing wired audio system.

2. Description of the Related Art

Speaker technology has consistently attempted to reproduce a recorded sound in the most realistic manner. The majority of speaker designs employ a variety of sound drivers mounted within an acoustic box. The sound drivers are then connected to an audio source via wires that supply the sound drivers with both power and audio signals. Such arrangements are static and not amenable two variations as the needs of the user change, as the speakers are moved, or as different audio sources and technologies are developed.

As technology advances, the ability to transmit sound information from location to location has similarly advanced. As such, a need exists for audio systems allowing for the interconnection of audio sources and speakers in a flexible, efficient, and acoustically optimized manner.

SUMMARY

According to a first aspect of the invention there may be provided an audio system including an audio/video receiver, a power supply/wireless audio distribution assembly connected to the audio/video receiver, speaker wire, and speakers compatible with the power supply/wireless audio distribution assembly.

In some embodiments the audio/video receiver includes audio processing technology.

In some embodiments the audio processing technology is Dolby ATMOS audio processing technology.

In some embodiments the power supply/wireless audio distribution assembly includes an AC input adapted for connection to a power source and multiple outputs adapted for connection to the speaker wire so as to connect each of the speakers to a power source.

In some embodiments no audio signals are sent through the speaker wire and the speaker wire is solely used as a means for transmitting power to each of the speakers.

In some embodiments the power supply/wireless audio distribution assembly includes a wireless transmitter for transmitting audio signals to each of the speakers.

In some embodiments each of the speakers include at least one amplifier and at least one receiver.

In some embodiments the at least one receiver of each of the speakers is a Bluetooth receiver and the wireless transmitter is a Bluetooth transmitter.

In some embodiments each of the speakers is an active speaker or speaker array.

In some embodiments the audio system includes a speaker assembly of which the speakers form a part thereof.

In some embodiments the speaker assembly includes a central support member to which the speakers are secured in a manner allowing for articulation of the speakers relative to each other.

Additional advantages of the invention will be set forth in part in the description which follows, and in part will be understood from the description, or may be learned by practice of the invention. The advantages will be realized and attained by means of the elements and combinations particularly pointed out in the appended claims.

DESCRIPTION OF THE PREFERRED EMBODIMENT

The detailed embodiment of the present invention is disclosed herein. It should be understood, however, that the disclosed embodiment is merely exemplary of the invention, which may be embodied in various forms. Therefore, the details disclosed herein are not to be interpreted as limiting, but merely as a basis for teaching one skilled in the art how to make and/or use the invention.

Figure 1:
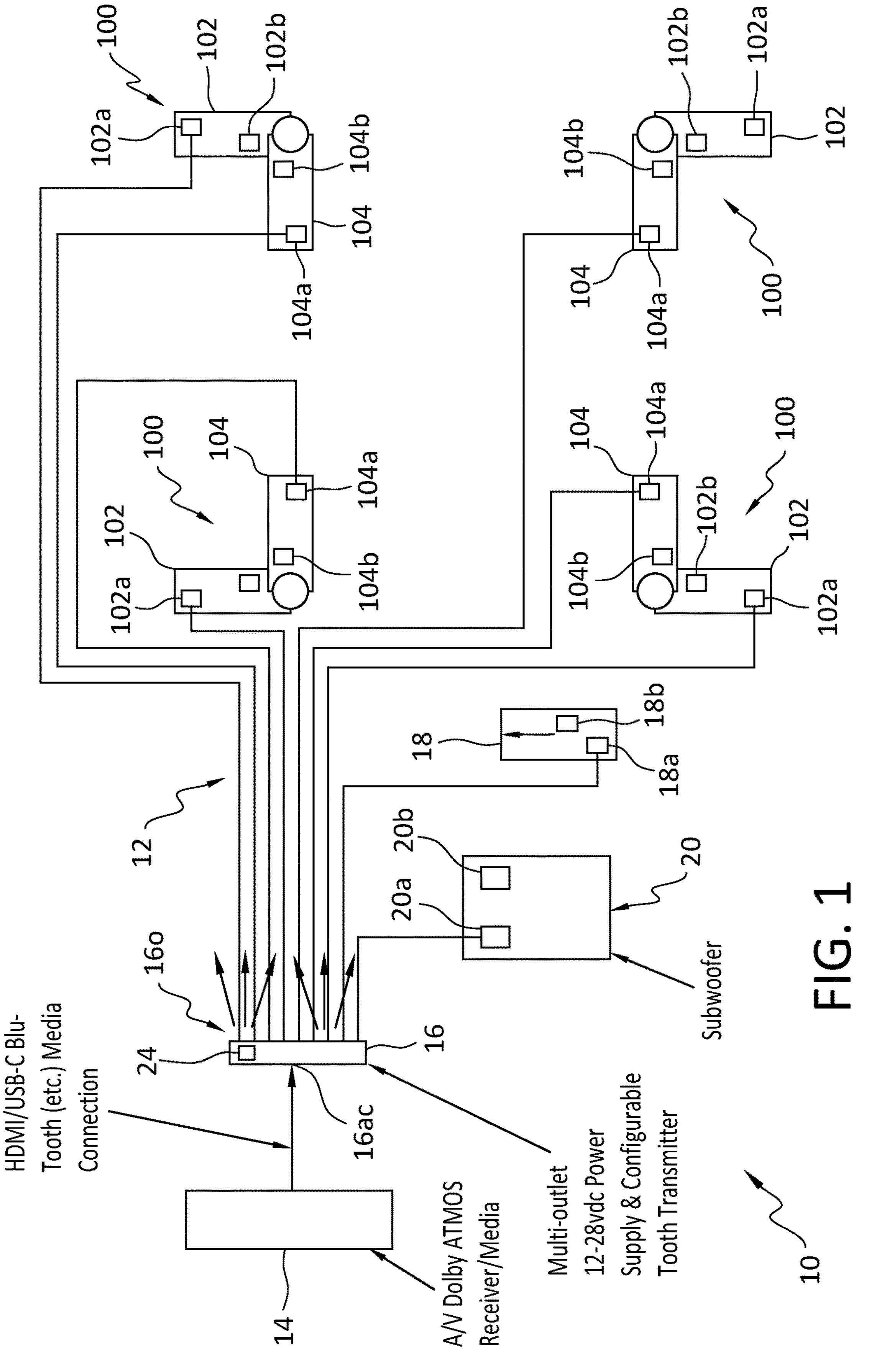
FIG. 1 is a schematic of the audio system of the present invention.
Figure 2:
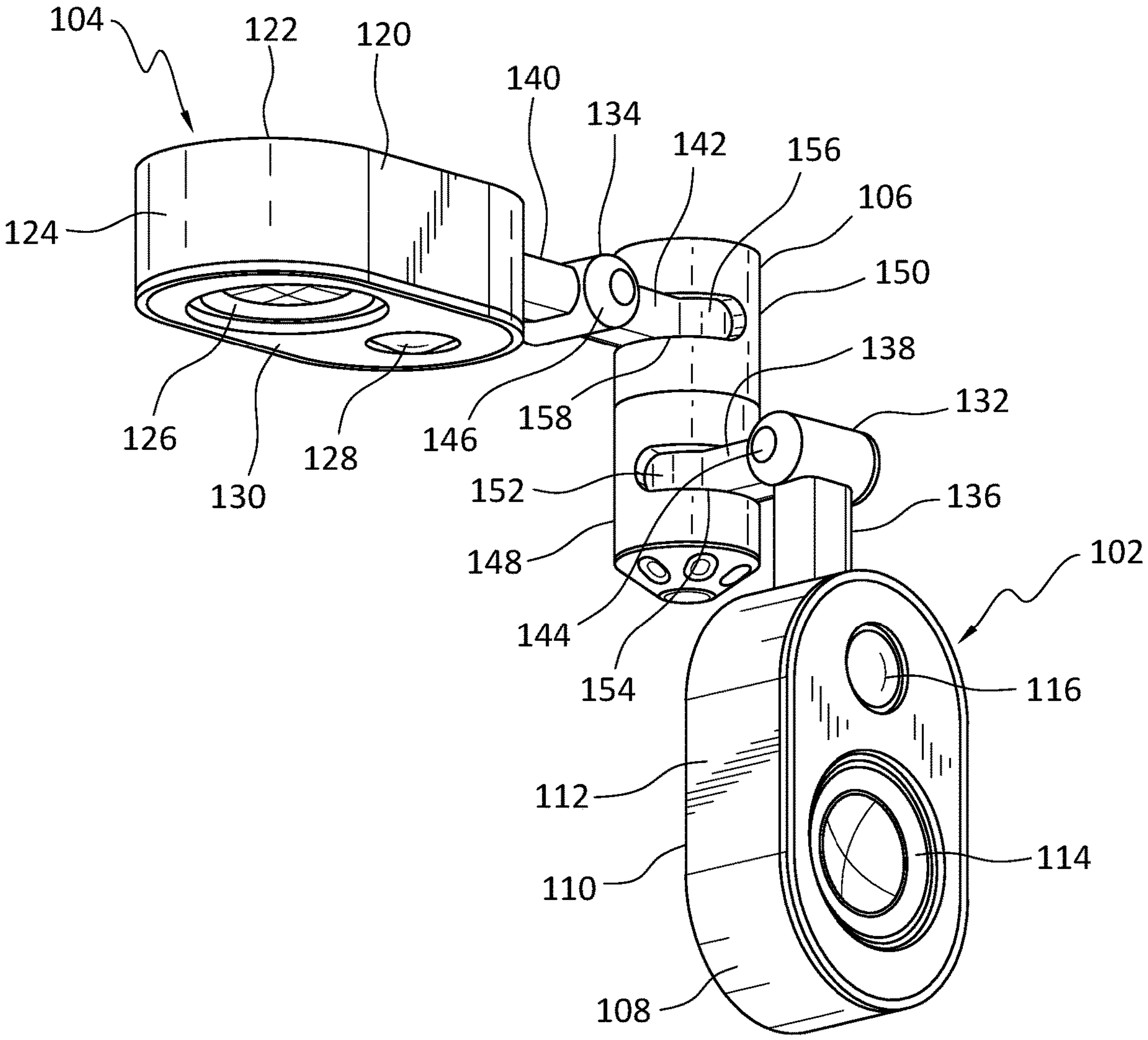
FIG. 2 is a perspective view of a speaker in accordance with the present invention.

With reference to FIGS. 1 and 2, an audio system 10 is disclosed for upgrading a previously existing wired audio system to take advantage of advances in audio processing and distribution. The present audio system 10 allows a user to take advantage of previously existing wiring 12 between an audio receiver and passive wired speakers in an upgraded system taking advantage of modern advances in audio technology. The audio system 10 in accordance with the present invention includes an audio/video receiver 14, a power supply/wireless audio distribution assembly 16, existing speaker wire 12 previously used to connect an audio receiver/amplifier with speakers, and upgraded speakers 18, 20, 102, 104 compatible with the power supply/wireless audio distribution assembly 16. As noted above, the audio system disclosed herein is described with reference to an audio/video receiver. However, it is appreciated the audio/video receiver may be replaced with various other audio/visual equipment offering similar functionalities, for example, televisions, media devices, computer, etc. As such, the use of the term audio/visual receiver as used in the following description should be broadly construed to cover the range of possible alternatives.

The present audio system 10 has been developed to specifically allow users to take advantage of DOLBY ATMOS technology without the need for complete rewiring of their previously existing audio/video systems. While the present invention is described for use in conjunction with DOLBY ATMOS technology, it is appreciated the present invention may be used in conjunction with various other sound processing technologies, including but not limited to, DTS-X or similar full 3-D audio. As those skilled in the art will appreciate, DOLBY ATMOS is the tradename for a sound processing technology that provides for greatly enhanced surround sound. DOLBY ATMOS allows for the controlled distribution of up to 128 discrete audio elements within a room to create a highly immersive audio/video environment. While DOLBY ATMOS allows for assignment of traditional audio tracks to specific audio channels (for example, left/right channel, rear channel, center channel, etc.), DOLBY ATMOS also enables multiple audio objects to be precisely defined and expressly positioned within the three-dimensional sound field.

Given the capability of DOLBY ATMOS (and similar 3-D audio processing technologies) to create extremely realistic three-dimensional sound environments, these kinds of audio systems are designed to work best utilizing a greater number of speakers than traditional/conventional DOLBY DIGITAL 5.1 or 7.1 speaker configurations require. This may necessitate the use of a combination of down-firing speakers, up-firing speakers, and other strategically positioned speakers to create the desired 3-dimensional audio environment. In so doing, the vast potential number of individual audio "objects/entities" may be accurately reproduced to create the visceral, textured and immersive audio experience associated with a movie, video game or other audio/video content. Within these new 3-D audio technologies, audio mixing engineers enjoy complete freedom to individually select specific placement and movement for each sound within the audio/video content's three-dimensional sound field. Once the audio objects and their relative locations and movements are designated by the audio mixing engineers, this data is captured and encoded into the A/V media. This data will be subsequently decoded by a DOLBY ATMOS (or similar 3D audio) equipped A/V receiver, Television, Media Device or Computer rendering the audio objects in real-time, such that each sound in the movie, video game or other audio/video content appears to be coming from a specific spatial position within the 3-dimensional sound field. Audio objects/entities may move not merely left to right or front to back, but, with these new types of surround sound technologies, distinct sounds may also move discreetly up or down to any point within the defined 3-D aural space.

The present invention takes advantage of the ability of three-dimensional audio processing to create such a sound environment by allowing users to upgrade their preexisting audio/video system with speakers and audio transmission capable of reproducing sound in accordance with protocols defined by DOLBY ATMOS or other state-of-the-art three-dimensional audio encoding/decoding systems.

As briefly mentioned above, the audio system 10 includes an audio/video receiver 14 containing DOLBY ATMOS (or similar) audio processing technology. The audio/video receiver 14 is, therefore, able to process encoded information from an audio/video source and output appropriate audio signals to various speakers within a room. In order to transmit the DOLBY ATMOS audio information being decoded by the audio/video receiver 14 to the speakers 18, 20, 102, 104 in a controlled and effective manner, the audio/video receiver 14 is connected to the power and audio transmission assembly 16. While some channels of audio can still be outputted from the conventional amplifier-to-speaker connections, doing so will be redundant in the main listening environment, while still potentially useful for secondary listening environments, i.e. other rooms or outdoor listening areas.

The power supply/wireless audio distribution assembly 16 serves two functions. First, the AC input 16*ac* of the power supply/wireless audio distribution assembly 16 is connected to a 100-240 AC/mains power source (for example, electricity coming from the audio/video receiver 14) and the multiple outputs 16*o* of the power supply/wireless audio distribution assembly 16 are connected to previously existing speaker wires 12 so as to connect each of the speakers 18, 20, 102, 104 in accordance with the present invention to a power source. That is, the power supply/wireless audio distribution assembly 16 is directly connected to the speakers 18, 20, 102, 104 and transmits 12-28 V DC through each pair of speaker wires 12 to the speakers 18, 20, 102, 104 connected thereto. In contrast to a typical arrangement, no audio signals are sent through the speaker wire 12 and the speaker wire 12 is solely used as a means for transmitting low-voltage (Class II) DC power to the wireless receiver/preamp/power amplifier co-located with each speaker 18, 20, 102, 104 connected thereto.

In addition to functioning as a power source, the power supply/wireless audio distribution assembly 16 also wirelessly transmits the decoded audio signals to each of the speakers comprising the audio system 10. The wireless transmission is preferably achieved via Bluetooth technology (as described below in the disclosed embodiment) or multi-channel, high-bandwidth capable WiFi technology, although it is appreciated other known wireless data transmission protocols may be used without departing from the spirit of the present invention.

The power supply/wireless audio distribution assembly 16 is preferably connected to the audio/video receiver 14 in a manner allowing for both the transmission of power thereto and the transmission of audio information from the audio/video receiver 14 to the power supply/wireless audio distribution assembly 16. The audio transmission includes all information necessary to control the speakers 18, 20 102, 104 in a manner rendering sound in accordance with the DOLBY ATMOS (or similar audio encode/decode technology) protocols/criteria. It should be appreciated that the power supply/wireless audio distribution assembly 16 does not contain the 3-D audio decoding processor, but takes the already decoded audio signals from the audio/video receiver 14 and wirelessly transmits the audio signals to the designated speakers comprising the 3-D audio listening environment. Once the audio information is received by the power supply/wireless audio distribution assembly 16, said assembly 16 converts the collective audio input and wirelessly transmits designated audio signals to the associated speakers comprising the audio system 10 via multiple Bluetooth transmitters 24 located within the power supply/wireless audio distribution assembly 16.

The speakers 18, 20, 102, 104 of the present audio system 10 are active speakers/speaker arrays specifically adapted to take advantage of the ability of the power supply/wireless audio distribution assembly 16 to provide them with 12-28 V DC (Class II) electrical power via previously existing speaker wire connections and audio data via wireless Bluetooth transmission. Each of the speakers 18, 20, 102, 104 within the system contains at least one amplifier 18*a*, 20*a*, 102*a*, 104*a* and at least one Bluetooth receiver 18*b*, 20*b*, 102*b*, 104*b*. The amplifier 18*a*, 20*a*, 102*a*, 104*a* of each of the speakers receives electricity from the power supply/wireless audio distribution assembly 16 via the speaker wire 12 and powers the drivers thereof to produce sound in accordance with the audio signals being transmitted (by) from the power supply/wireless audio distribution assembly 16 to the Bluetooth receiver 18*b*, 20*b*, 102*b*, 104*b* of the speaker 18, 20, 102, 104. The Bluetooth receiver 18*b*, 20*b*, 102*b*, 104*b* is paired with the Bluetooth transmitters 24 of power supply/wireless audio distribution assembly 16 and receives audio signals instructing the speaker 18, 20, 102, 104 as to the sounds that should be reproduced.

While some speakers within an audio system 10 may be easy to replace with speakers 18, 20 operating in accordance with the present invention (for example, center channel or bookshelf speakers that are positioned on tables, floors or stands within the room), other speakers are more difficult to replace (for example, wall and/or ceiling recessed/mounted speakers). The present invention provides a convenient speaker assembly 100 allowing for replacement of wall and/or ceiling recessed mounted (or surface/bracket mounted) speakers, enabling enhanced sound field reproduction by replacing a single passive-type driver with a plurality of drivers that may be positioned in a variety of orientations, with each array individually selectable for the chosen audio content.

With reference to FIG. 2, each of these speaker assemblies 100 includes first and second assembly speakers 102, 104 connected to a central support member 106 in a manner allowing for complete articulation of the first and second assembly speakers 102, 104 relative to each other. The central support member 106 is adapted to be secured to a mounting bracket positioned within a recess where a recessed wall or ceiling speaker used to reside. Once mounted, the first and second assembly speakers 102, 104 are positioned in a desired manner to allow for directing sound in a variety of directions. The first and second assembly speakers 102, 104 are substantially identical to each other.

The first assembly speaker 102 includes a first enclosure 108 with a first base wall 110 and a first sidewall 112. The first enclosure 108 defines a cavity shaped and dimensioned for receiving a first midrange driver 114 and a first high frequency driver 116. The first midrange driver 114 and first high frequency driver 116 are secured within the first enclosure 108 via a first face plate 118.

With reference to the second assembly speaker 104, it includes a second enclosure 120 with a second base wall 122 and a second sidewall 124. The second enclosure 120 defines a cavity shaped and dimensioned for receiving a second midrange driver 126 and a second high frequency driver 128. The second midrange driver 126 and the second high frequency driver 128 are secured within the second enclosure 120 via a second face plate 130.

The central support member 106 connects and supports the first and second assembly speakers 102, 104. As such, each of the first and second assembly speakers 102, 104 includes a connection arm 132, 134. Each of the connection arms 132, 134 is articulated and constructed to bend in a manner allowing a user to selectively position the first and second assembly speakers 102, 104 in a desired orientation. As such, each of the connection arms 132, 134 includes first and second arm members 136, 138, 140, 142 that are pivotally connected at a hinge 144, 146 that may be loosened and tightened as desired to allow for adjustment of the positioning of the respective first and second assembly speakers 102, 104.

The connection arm 132 of the first assembly speaker 102 is pivotally coupled to the central support member 106 along a first section 148 thereof, while the connection arm 134 of the second assembly speaker 104 is pivotally coupled to the central support member 106 along a second section 150 thereof. The first section 148 and the second section 150 may be selectively rotated relative to each other so as to move the first and second assembly speakers 102, 104.

The connection arm 132 of the first assembly speaker 102 includes a first coupling cylinder 152 secured at the distal end thereof opposite the first assembly speaker 102. The first coupling cylinder 152 is oriented transverse to the connection arm 132 of the first assembly speaker 102 (that is, the central radial axis of the first coupling cylinder 152 is substantially perpendicular to the central radial axis of the connection arm 132 of the first assembly speaker 102) and is shaped and dimensioned to fit within the first section 148 of the central support member 106. The first coupling cylinder 152 is shaped and dimensioned to snuggly fit within the first section 148 of the central support member 106 such that the first coupling cylinder 152 and, ultimately, the first assembly speaker 102 may be frictionally locked in a desired orientation relative to the central support member 106.

The first section 148 of the central support member 106 is provided with a first arcuate slot 154 through which the connection arm 132 of the first assembly speaker 102 passes as the first coupling cylinder 152 sits within the first section 148 of the central support member 106. In addition to providing a passageway for securing the first coupling cylinder 152 within the central support member 106, the first arcuate slot 154 limits the pivotal movement of the first assembly speaker 102 relative to the central support member 106. In accordance with a preferred embodiment, movement is limited to an arc of 32.5°.

The second assembly speaker 104 is similarly coupled to the second section 150 of the central support member 106. In particular, the connection arm 134 of the second assembly speaker 104 is pivotally coupled to the central support member 106 along a second section 150 thereof, while the connection arm 134 of the second assembly speaker 104 is pivotally coupled to the central support member 106 along a second section 150 thereof. The second section 150 and the first section 148 may be rotated relative to each other so as to move the first and second assembly speakers 102, 104 relative to each other.

The connection arm 134 of the second assembly speaker 104 includes a second coupling cylinder 156 secured at the distal end thereof opposite the second assembly speaker 104. The second coupling cylinder 156 is oriented transverse to the connection arm 134 of the second assembly speaker 104 (that is, the central radial axis of the second coupling cylinder 156 is substantially perpendicular to the central radial axis of the connection arm 134 of the second assembly speaker 104) and is shaped and dimensioned to fit within the second section 150 of the central support member 106. The second coupling cylinder 156 is shaped and dimensioned to snuggly fit within the second section 150 of the central support member 106 such that the second coupling cylinder 156 and, ultimately, the second assembly speaker 104 may be frictionally locked in a desired orientation relative to the central support member 106.

The second section 150 of the central support member 106 is provided with a second arcuate slot 158 through which the connection arm 134 of the second assembly speaker 104 passes as the second coupling cylinder 156 sits within the second section 150 of the central support member 106. In addition to providing a passageway for securing the second coupling cylinder 156 within the central support member 106, the second arcuate slot 158 limits the pivotal movement of the second assembly speaker 104 relative to the central support member 106. In accordance with a preferred embodiment, movement is limited to an arc of 32.5°.

Figure 3:
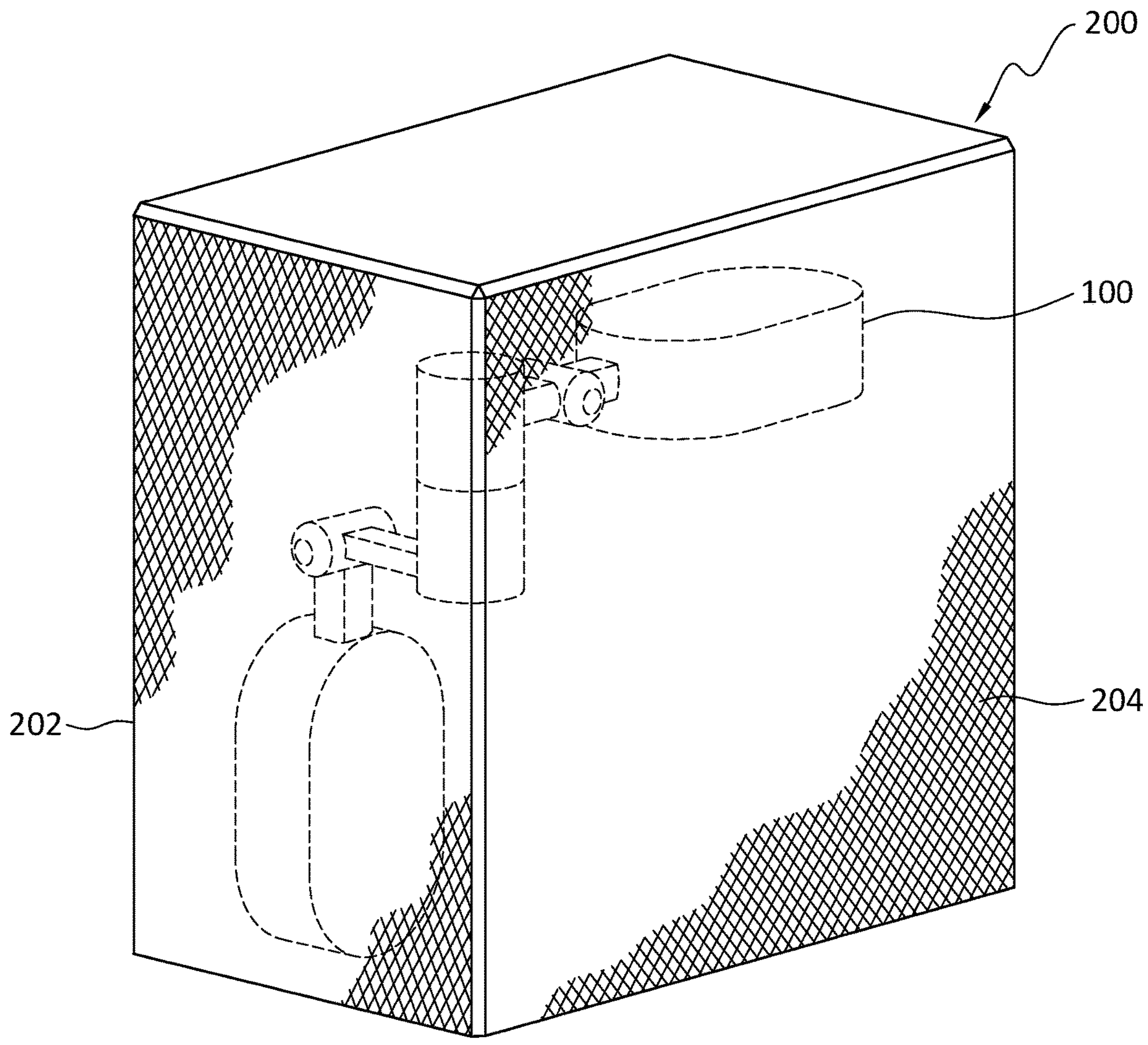
FIG. 3 is a perspective view of an embodiment employing a speaker assembly housing.

In accordance with yet another embodiment, and with reference to FIG. 3, it is contemplated the speaker assembly 100 may be housed within a speaker assembly housing 200. Such a speaker assembly housing 200 provides consumers with the ability to conceal the speaker assembly 100 where the room and the desires of the homeowner dictate a concealed design. In particular, the speaker assembly housing 200 includes a box-like framework 202 covered with a sonically lucent material 204. The housing 200 may be secured directly to the speaker assembly 100 or may be secured to the wall of ceiling to which the speaker assembly is mounted 100.

While the preferred embodiments have been shown and described, it will be understood that there is no intent to limit the invention by such disclosure, but rather, is intended to cover all modifications and alternate constructions falling within the spirit and scope of the invention.

The invention claimed is:

1. An audio system, comprising:

an audio/video receiver;

a power supply/wireless audio distribution assembly connected to the audio/video receiver;

speaker wire; and speakers compatible with the power supply/wireless audio distribution assembly, wherein the speaker wire connects the power supply/wireless audio distribution assembly to the speakers, each of the speakers comprising:

first and second assembly speakers connected to a central support member the central support member includes a first portion secured to the first assembly speaker and a second portion secured to the second assembly speaker, the first portion and the second portion being selectively rotated relative to each other;

the first assembly speaker includes a connection arm secured to the first portion of the central support member and the second assembly speaker includes a connection arm secured to the second portion of the central support portion, each of the connection arms being articulated and constructed to bend in a manner allowing a user to selectively position the first and second assembly speakers in a desired orientation;

the first assembly speaker includes an amplifier and a receiver, the first assembly speaker also includes a first enclosure with a first base wall and a first sidewall, the first enclosure defines a cavity shaped and dimensioned for receiving a first midrange driver and a first high frequency driver, the first midrange driver and first high frequency driver are secured within the first enclosure via a first face plate; and the second assembly speaker includes an amplifier and a receiver, the second assembly speaker also includes a second enclosure with a second base wall and a second sidewall, the second enclosure defines a cavity shaped and dimensioned for receiving a second midrange driver and a second high frequency driver, the second midrange driver and the second high frequency driver are secured within the second enclosure via a second face plate.

2. The audio system according to claim 1, wherein the audio/video receiver includes an audio processing technology.

3. The audio system according to claim 2, wherein the audio processing technology is DOLBY ATMOS audio processing technology.

4. The audio system according to claim 1, wherein the power supply/wireless audio distribution assembly includes an AC input adapted for connection to a power source and multiple outputs adapted for connection to the speaker wire so as to connect each of the speakers to a power source.

5. The audio system according to claim 4, wherein no audio signals are sent through the speaker wire and the speaker wire is solely for transmitting power to each of the speakers.

6. The audio system according to claim 5, wherein the power supply/wireless audio distribution assembly includes a wireless transmitter for transmitting audio signals to each of the speakers.

7. The audio system according to claim 6, wherein the receiver of each of the first and second assembly speakers is a BLUETOOTH receiver and the wireless transmitter is a Bluetooth transmitter.

8. The audio system according to claim 1, wherein no audio signals are sent through the speaker wire and the speaker wire is solely used as a means for transmitting power to each of the speakers.

9. The audio system according to claim 1, wherein the power supply/wireless audio distribution assembly includes a wireless transmitter for transmitting audio signals to each of the speakers.

10. The audio system according to claim 1, wherein the central support member is adapted to be secured to a mounting bracket.

11. The audio system according to claim 1, wherein the first and second assembly speakers are substantially identical to each other.

12. The audio system according to claim 1, wherein each of the connection arms includes first and second arm members that are pivotally connected at a hinge that may be loosened and tightened as desired to allow for adjustment of the positioning of the respective first and second assembly speakers.

13. The audio system according to claim 1, wherein the connection arm of the first assembly speaker includes a first coupling cylinder secured at a distal end thereof opposite the first assembly speaker, the first coupling cylinder is oriented transverse to the connection arm of the first assembly speaker and is shaped and dimensioned to fit within a first section of the central support member.

14. The audio system according to claim 13, wherein the first coupling cylinder is shaped and dimensioned to snuggly fit within the first section of the central support member such that the first coupling cylinder and, ultimately, the first assembly speaker may be frictionally locked in a desired orientation relative to the central support member.

15. The audio system according to claim 14, wherein the first section of the central support member is provided with a first arcuate slot through which the connection arm of the first assembly speaker passes as the first coupling cylinder sits within the first section of the central support member.

* * * * *